United States Patent [19]

Krauskopf

[11] Patent Number: 4,783,757

[45] Date of Patent: Nov. 8, 1988

[54] THREE INPUT BINARY ADDER

[75] Inventor: Joseph C. Krauskopf, Santa Clara, Calif.

[73] Assignee: Intel Corporation, Santa Clara, Calif.

[21] Appl. No.: 813,019

[22] Filed: Dec. 24, 1985

[51] Int. Cl.$^4$ ............................................... G05F 7/50
[52] U.S. Cl. ................................................... 364/784
[58] Field of Search .................................. 364/784–788

[56] References Cited

U.S. PATENT DOCUMENTS

| | | | |
|---|---|---|---|
| 3,636,334 | 1/1972 | Svoboda | 364/786 |
| 4,152,775 | 5/1979 | Schwartz | 364/786 |
| 4,399,517 | 8/1983 | Niehaus et al. | 364/784 |
| 4,547,863 | 10/1985 | Colardelle | 364/784 |

FOREIGN PATENT DOCUMENTS 0143456 6/1985 European Pat. Off. ............ 364/784

Primary Examiner—Gary V. Harkcom
Assistant Examiner—Long Thanh Nguyen
Attorney, Agent, or Firm—Blakely, Sokoloff, Taylor & Zafman

[57] ABSTRACT

A three input binary adder with only a single carry path. First adder circuits receive one bit of each of the three words of the same significance. Second cells which include a carry path are coupled to the first circuits such that one of the bits of lower significance from the first circuits is coupled to one of the cells and the other bit from the first circuit is coupled to the next of the cells along the carry path.

4 Claims, 2 Drawing Sheets

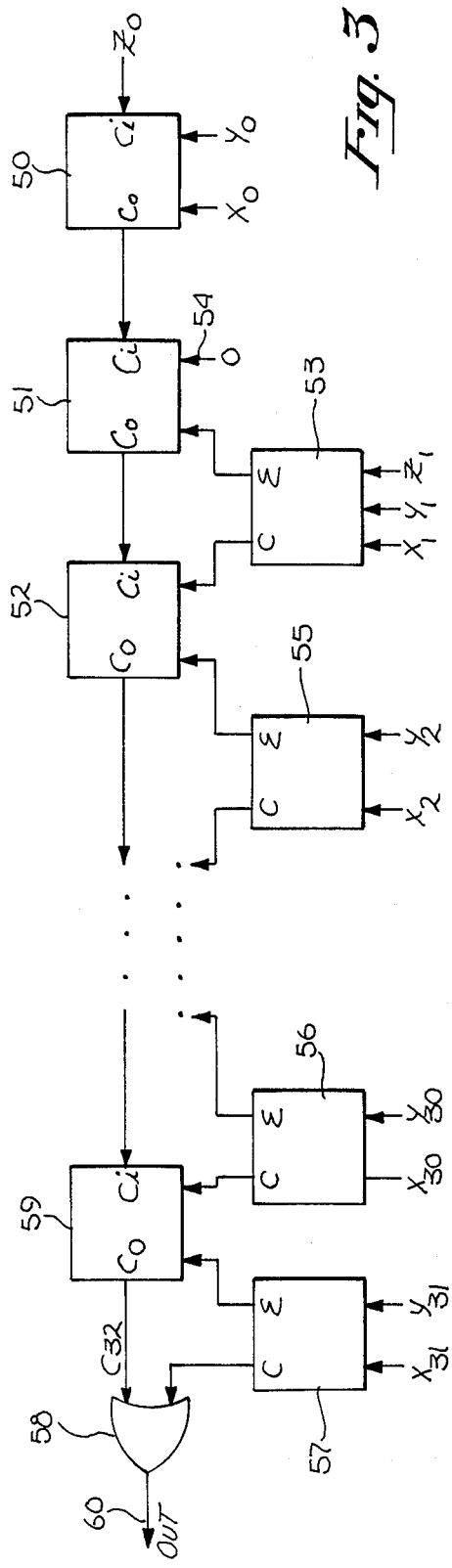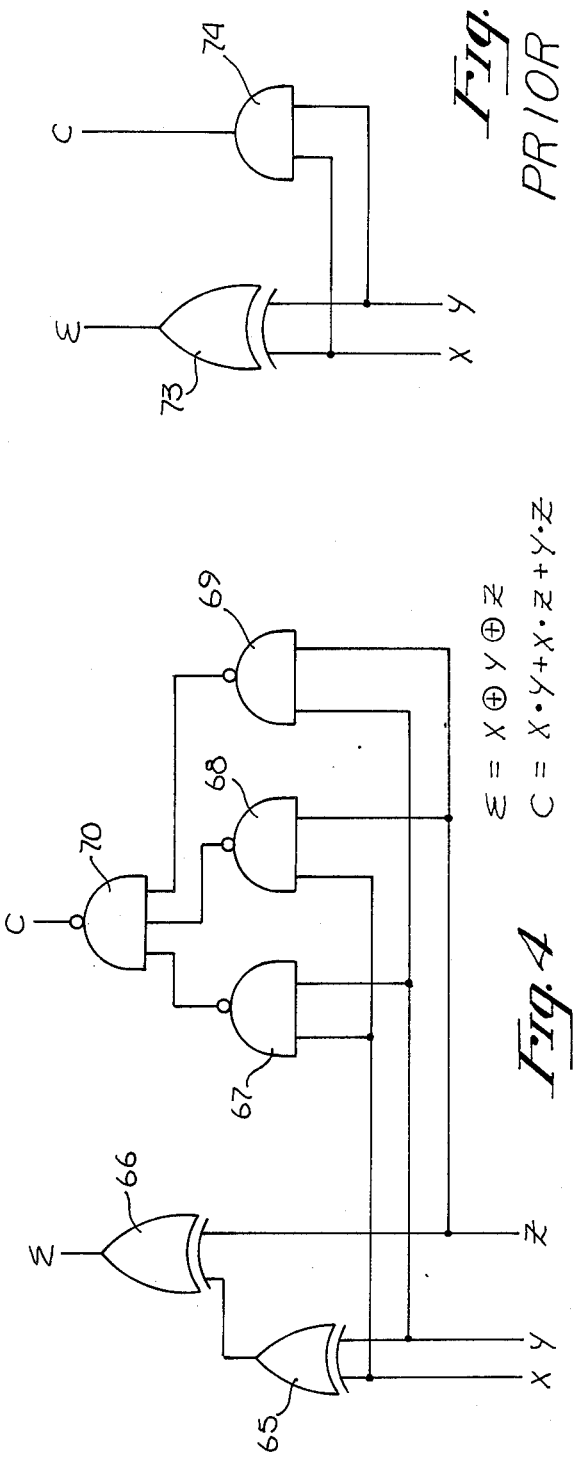

THREE INPUT BINARY ADDER

BACKGROUND OF THE INVENTION

1. Field of the Invention

The invention relates to the field of binary adders or summers.

2. Prior Art

In a typical binary adder a plurality of cells are used, each of which receives a carry-in signal from the preceding cell. The carry signal propagates from one cell to the next. This propagation, particularly for larger binary words, causes the addition to be somewhat slow. In some cases, carry lookahead circuits are used to speed up this process.

Where three digital words are to be summed with prior art circuitry, as will be discussed in conjunction with FIG. 1, two carry signal paths are present causing even a greater time delay.

As will be seen, the present invention provides an adder for adding or summing three binary words with only a single carry signal path.

SUMMARY OF THE INVENTION

A circuit for adding or summing three binary words is disclosed. The circuit includes a plurality of first circuits each receiving one bit of the same significance of the three binary words and each providing a two bit binary output where one of the two bits is of lower significance than the other. A plurality of adder cells are also used, each of which has a carry-input and carry-output terminal. These cells are coupled in series such that one of the carry-output terminals of one of the cells is coupled to the carry-input terminal of the next of the cells in the series. The first circuits are coupled to the cells such that the bit of lower significance from one of the first circuits is coupled to one of the cells and the other bit from the same one of the first circuits is coupled to the next of the cells in series. In this manner, only a single carry path is used.

BRIEF DESCRIPTION OF THE DRAWINGS

FIG. 3 is an alternate embodiment of the circuit of FIG. 2 where one of the three binary words has a range of 0-3.

FIG. 4 is an electrical schematic of one of the circuits used in the summer circuits of FIGS. 2 and 3.

FIG. 5 is an electrical schematic of a circuit used in the summer circuit of FIG. 3.

DETAILED DESCRIPTION OF THE PRESENT INVENTION

Figures 1, 2:
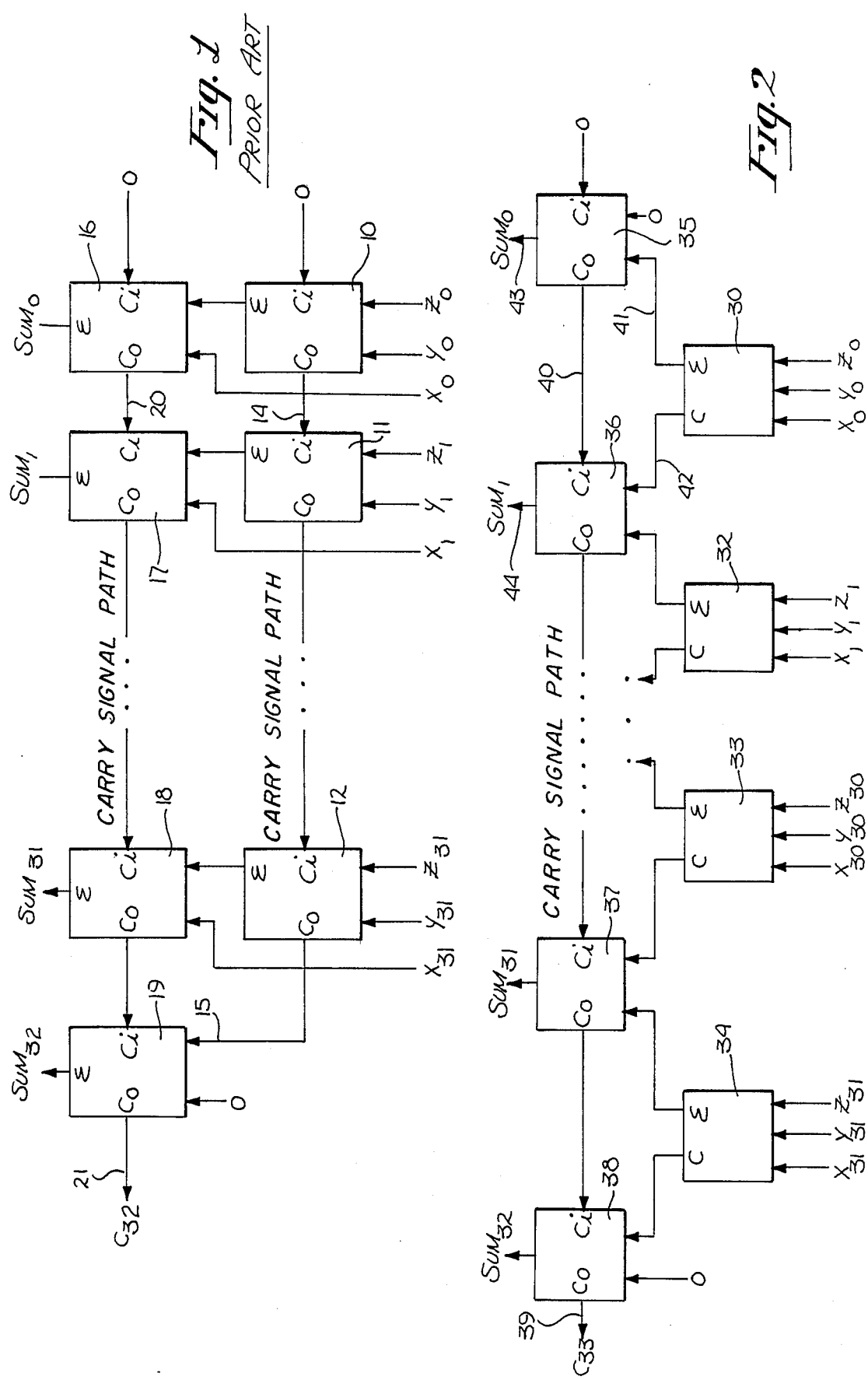
FIG. 1 is a block diagram showing prior art adder circuits used for summing three binary words.
FIG. 2 is a block diagram of a summer circuit built in accordance with the present invention.

A circuit for summing three binary words is described. In the following description, numerous specific details such as specific circuits and number of bits, etc., are provided to enable a thorough understanding of the present invention. It will be obvious to one skilled in the art, however, that the present invention may be practiced without these specific details. In other instances, well-known processing and logic circuits are not described in detail in order not to unnecessarily obscure the present invention.

The summer circuit of the present invention is realized as part of a 32-bit microprocessor. The microprocessor is fabricated on a single substrate employing complementary metal-oxide-semiconductor (CMOS) technology. Other technologies such as bipolar, n-MOS, SOS, etc., may be used to realize the present invention.

PRIOR ART SUMMER OF FIG. 1

First referring to FIG. 2, assume it is necessary to add three binary words $X_n$, $Y_n$ and $Z_n$ where each of the words are 32-bits in length. In the prior art, standard adder cells are employed such as shown by cells 10, 11, 12, 16, 17, 18 and 19 of FIG. 1. Each cell receives two input signals and a carry-in signal and provides an output sum signal and a carry-out signal. The sum signal is represented by the equation:

$$\Sigma = Y_n \oplus Z_n \oplus C_n$$

where X and Y are the inputs and $C_n$ is the carry-in signal. $\oplus$ represents an "exclusive or" function. The carry-out signal of each cell can be represented by the equation:

$$C_{out} = Y_n \cdot Z_n + (Y_n + Z_n) \cdot C_n$$

where + represents an "or" function and · represents a "logical and" function.

As shown in FIG. 1, with prior art techniques, a plurality of series coupled first cells such as cells 10, 11 and 12 receive as inputs two of the binary words $Y_n$ and $Z_n$. These first circuits have a carry signal series path illustrated by line 14 between cells 10 and 11 and a carry-out signal at the end of the series, line 15 of cell 12.

A plurality of second cells have their carry-in and carry-out terminals coupled in series, for example, cell 16 is coupled to cell 17 through line 20. Each of the second circuits receives the $\Sigma$ signal from one of the first circuits and one bit of the word $X_n$. For instance, cell 17 receives the $\Sigma$ signal from cell 11 and the $X_1$ signal.

The sum of the three binary words is provided at the $\Sigma$ terminals of the second cells, for instance, $SUM_{31}$ is provided by cell 18 and the carry-out signal for the sum of the three binary words is provided on line 21 at the carry-out terminal of cell 19.

As is apparent in FIG. 1, there are two carry signal paths, one associated with cells 10, 11 and 12 and the other with cells 16, 17, 18 and 19. And again, by way of illustration, cell 11 cannot complete its computation until it receives the carry-out signal from cell 10 and cell 17 cannot complete its computation until it receives the $\Sigma$ signal from cell 11. Therefore, the two carry signal paths provide more delay than a single carry signal path.

FIG. 2 EMBODIMENT OF PRESENT INVENTION

The summing circuit of FIG. 2 includes a plurality of first circuits 30, 32, 33 and 34. Each first circuit receives one bit of the same significance of each of the digital words. Accordingly, circuit 30 is coupled to receive $X_0$, $Y_0$, $Z_0$, circuit 32 receives $X_1$, $Y_1$, $Z_1$, etc. Each of the first circuits sums the three input bits and provides two output signals representing the sum, one of which is of lower significance than the other. These two bits are shown for circuit 30 as the $\Sigma$ output coupled to line 41

(lower significant bit) and the C output coupled to line 42 (higher significant bit). The specific logic functions performedby the first circuits of FIG. 2 are shown by the equations set forth in FIG. 4 and a specific circuit for obtaining this function is also shown in FIG. 4.

The summing circuit of FIG. 2 employs a plurality of second circuits 35, 36, 37 and 38, each of which may be one of the standard adder cells used in the prior art circuit of FIG. 1. Each of these cells, as mentioned, receives two input signals and a carry-in signal and provides an output sum signal and a carry-out signal. The carry-out and carry-in terminals of the cells are coupled in series to provide a carry signal path, for example, the carry-out terminal of cell 35 is coupled to the carry-in terminal of cell 36 via line 40.

The first circuits of FIG. 2 are coupled to the cells such that the bit of lower significance from one first circuit is coupled to one cell and the other of the bits from the one of the first circuits is coupled to the next of the cells in the series along the carry signal path. Again, by way of example, the $\Sigma$ output from circuit 30 provides one input to cell 35 via line 41 while the other output (C) from circuit 30 provides one input to cell 36 via line 42.

For the embodiment of FIG. 2, it is assumed that three 32-bits words are to be summed. Thirty-two first circuits and thirty-three cells are used. The first cell 35 receives a zero carry-in and one of its terminals also receives a zero input. The last cell 38 receives a zero input at one of its terminals and its carry-out terminal (line 39) represents the carry-out for the sum of three binary words. One bit of the 32-bit sum signal is provided at each of the cells, such as shown by $SUM_0$ (line 43) and $SUM_1$ (line 44).

With the coupling employed between the first circuits and cells of FIG. 2, one of the carry signal paths is eliminated. Note there is no carry signal path associated with the first circuits 30, 32, 33 and 34. The single carry signal path of FIG. 2 enables the summer circuit of FIG. 2 to more quickly provide the sum signal. The first circuits can simultaneously provide their outputs.

While not illustrated in FIG. 2 or 3, a carry lookahead mechanism is employed to further reduce the time required for the circuit to provide a sum. The particular carry lookahead mechanism is described in copending application entitled Optimally Partitioned Regenerative Carry Lookahead Adder, Ser. No. 820,384, filed Jan. 21, 1986 and assigned to the assignee of the present invention.

FIG. 3 EMBODIMENT

A special case of the circuit of FIG. 2 is illustrated in FIG. 3. The circuit of FIG. 3 is used for summing X and Y which may each be 32-bit words and Z which has a value of decimal 0-3. As currently used the 32-bit sum is not required, but rather only the output signal shown at the output of the OR gate 58 (line 60). More particularly, the circuit of FIG. 3 is used in connection with determining segment limit violations in a memory management unit. For this application, the delay that would be associated with a second carry signal path can cause a significant problem since the violation condition should be determined within a relatively short predetermined period.

For the embodiment of FIG. 3, a plurality of first circuits 55, 56 and 57 are used. These circuits receive the X and Y binary words beginning with $X_2$, $Y_2$, through $X_{31}$, $Y_{31}$, etc. Each of the circuits sums these two digital bits and provides an output $\Sigma$ and C signal. This specific circuit used in the currently preferred embodiment for circuits 55, 56 and 57 is shown in FIG. 5. One circuit 53 is used which may be identical to the first circuits of FIG. 2, and specifically illustrated in FIG. 4. A plurality of standard cells such as are used in FIG. 1 may also be used, however, the "sum" output is not needed, but rather only the carry-out signal. For the specific circuit of FIG. 3, n−2 first circuits (30 circuits) are used along with n cells (32 circuits).

The first cell 50 receives $X_0$, $Y_0$, and $Z_0$ as a carry-in signal. The next cell 51 receives the $\Sigma$ signal from circuit 53; its other terminal (line 54) receiving a binary zero. The circuits 53, 55, 56 and 57 are coupled to the cells in the same manner as described in conjunction with FIG. 2. The OR gate 58 receives a carry-out signal from cell 59 and the C signal from circuit 57.

Referring to FIG. 4, a circuit 30 of FIG. 2 or the circuit 53 of FIG. 3 includes two exclusive OR gates 65 and 66 and four NAND gates 67, 68, 69 and 70. Gate 65 is coupled to receive one bit of both the X and Y words (of same significance); the gate 66 receives the output of gate 65 and one bit of the Z word again of the same significance. The sum signal at the output of gate 66 can be represented by $\Sigma = X \oplus Y \oplus Z$. Gate 67 receives as its inputs one bit of the X and Y words, gate 68 one bit of the X and Z words, and gate 69 one bit of the Y and Z words. The outputs of gates 67, 68 and 69 are inputs to the gate 70. The C signal is obtained at the output of gate 70 and can be represented by $C = Y \cdot Y + Y \cdot Z + Y \cdot Z$.

The circuit of FIG. 5, which for example, can be used for circuits 55, 56 and 57 of FIG. 3 includes an exclusive OR gate 73 and AND gate 74. The X and Y signals are inputs to both of these gates, the C output is obtained at the output of gate 74 and the $\Sigma$ output at the output of gate 73.

The circuits of FIGS. 1–5 are most often used in conjunction with timing signals well-known in the art.

Thus, a three input adder has been described which has only a single carry signal path.

I claim:

1. A circuit for summing three binary words of N bits comprising:
   a plurality of first circuits each for receiving one bit of the same significance of each of said three binary words and for providing a binary output having two bits wherein one of said two bits is of lower significance than the other of said two bits;
   a plurality of adder cells, each having a carry-input terminal and carry-output terminal, said adder cells being coupled in series such that one of said carry-output terminals of one of said adder cells is coupled to one of said carry-input terminals of the next of said adder cells in said series;
   said first circuits being coupled to said adder cells such that the lower significance bit of the ith one of said first circuits is coupled to the $i^{th}$ one of said adder cells in said series wherein i=1, 2, N; and said other of said two bits is coupled to $(i+1)^{th}$ one of said adder cells;
   a final $N^{th}$ carry from the last one of the first circuits is connected to the $(N+1)^{th}$ adder cell which also accepts the $N^{th}$ adder cell's carry;
   whereby three binary words are summed with only a single carry output terminal signal path.

2. A circuit for summing three binary words, each having at least n bits, said circuit comprising:

n first adder circuits each for receiving three bits of the same significance of each of said words and for providing a binary output having a first bit, and a second bit of lower significance than said first bit;

n+1 second adder circuits each for resolving two bits of the same significance and a carry-input signal, each second adder circuit provides an output sum bit and carry-output signal, said carry signals of said second adders being coupled in series such athat said carry-out signal of the $(n-1)^{th}$ one of said second adder circuits is said carry-input signal of the nth one of said second adder circuits;

said first circuits being coupled to said second adder circuits such that said second bit of the $(n-1)^{th}$ one of said first circuits is coupled to said $(n-1)^{th}$ one of said second circuits and said first bit of said $(n-1)^{th}$ one of said first adder circuits is coupled to the $n^{th}$ one of said second adder circuits;

whereby three binary words are summed with only a single carry signal path.

3. A circuit for summing three binary words X, Y, and Z of n bits, said circuit comprising:

a plurality of first circuits each for receiving one bit of the same significance of X, Y, and Z and for providing a first sum signal $\Sigma^1_n$ representing $(X_n \oplus Y_n \oplus Z_n)$ where "$\oplus$" is "exclusive OR" and a first carry-out signal $C^1_n$ representing $(X_n \cdot Y_n + X_n \cdot Z_n + Y_n \cdot Z_n)$ where "+" is "logical OR" and "·" is "logical AND";

a plurality of second circuits each receiving one of said $\Sigma^1_n$ signals, one of said $C^1_n$ outputs, and a carry-in signal $C^2_{in}$ and for providing a second sum signal $\Sigma^2_n$ and a second carry-out signal $C^2_{o(n)}$ said second circuits being coupled to each other and to said first circuits such that $$\Sigma^2_n = \Sigma^1_n \oplus C^1_{(n-1)} \oplus C^2_{(n=1)}$$

and $$C^2_{o(n)} = C^1_{(n-1)} \cdot \Sigma^1_n + (C^1_{(n-1)} + \Sigma^1_n) \cdot C^2_{o(n-1)}$$

whereby said three binary words are summed with only a single carry signal path.

4. A circuit for determining a carry-out digit from summing of three digital words X, Y and Z of n bits where Z's values range from decimal 0–3, said circuit comprising:

$(n-2)$ first circuits each for receiving one bit of the same significance of said binary words X and Y for the portions of said binary words from $X_2$ through $X_n$ and $Y_2$ through $Y_n$ and for providing a binary output having two bits where one of said two bits is of lower significance than the other of said bits;

a second circuit for receiving the signals $X_1$, $Y_1$ and $Z_1$ and for providing a binary output having two bits where one of said two bits is of lower significance than the other of said two bits;

n adder cells each having a carry-input terminal and a carry-output terminal, said adder cells being coupled in series such that one of said carry-output terminals of one of said adder cells is coupled to one of said carry-input terminals of the next of said adder cells in said series;

the first of said adder cells having its carry-input terminal coupled to receive the signal $Z_o$;

each of said adder cells having two other input terminals, the input terminals of said first adder cells being coupled to receive $X_o$ and $Y_o$;

said bit having lower significance of said second circuit being coupled to one of said terminals of said second one of said adder cells and the other bit of said second circuit being coupled to one terminal of the third one of said adder cells;

said first circuits being coupled to the remainder of said adder cells beginning with the first of said first circuits being coupled to said third adder cell and said fourth adder cell, such that the one of said bits having lower significance from one of said first circuits is coupled to one of said adder cells and the other having bits from said first circuit is coupled to the next of said adder cells in said series;

a carry-output terminal from the $(n-2)^{th}$ one of said $(n-2)$ first circuits and said carry-output terminal of said nth adder cell being coupled to a logic circuit for providing said carry-out digit from summing of said three digital words X, Y and Z;

whereby three binary words are summed with only a single carry signal path.

* * * * *